April 4, 1950     D. KELLEHER     2,502,653
CLUTCH PLATE
Filed Aug. 7, 1945     2 Sheets-Sheet 1
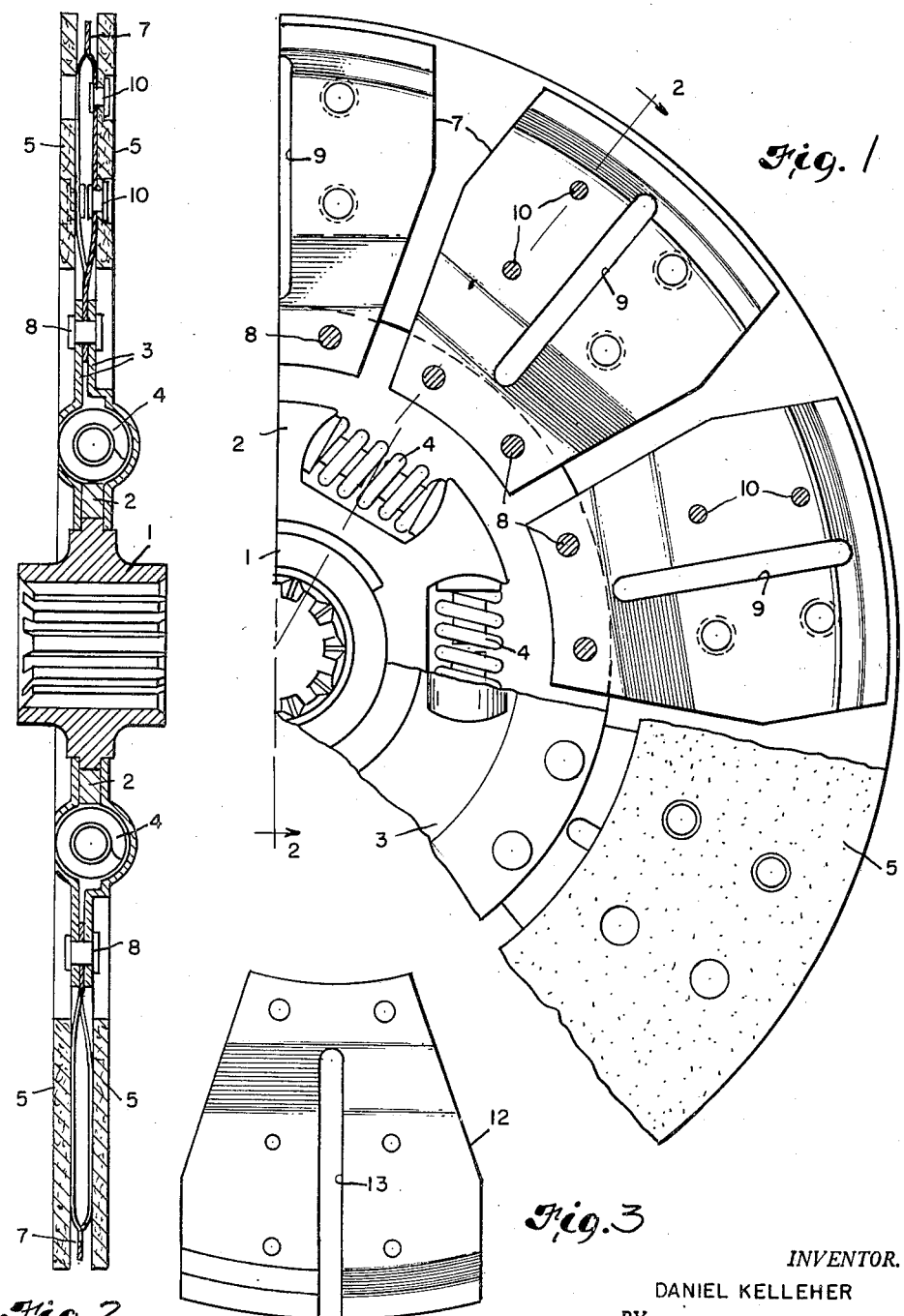
INVENTOR.
DANIEL KELLEHER
BY
Oberlin + Limbach
ATTORNEYS April 4, 1950 D. KELLEHER 2,502,653
CLUTCH PLATE
Filed Aug. 7, 1945 2 Sheets-Sheet 2
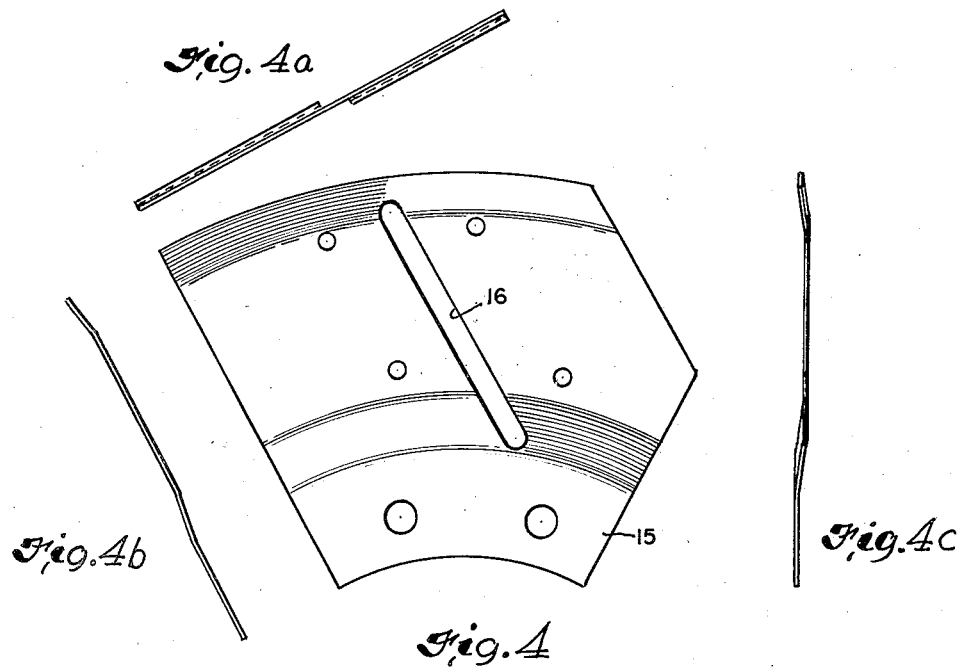
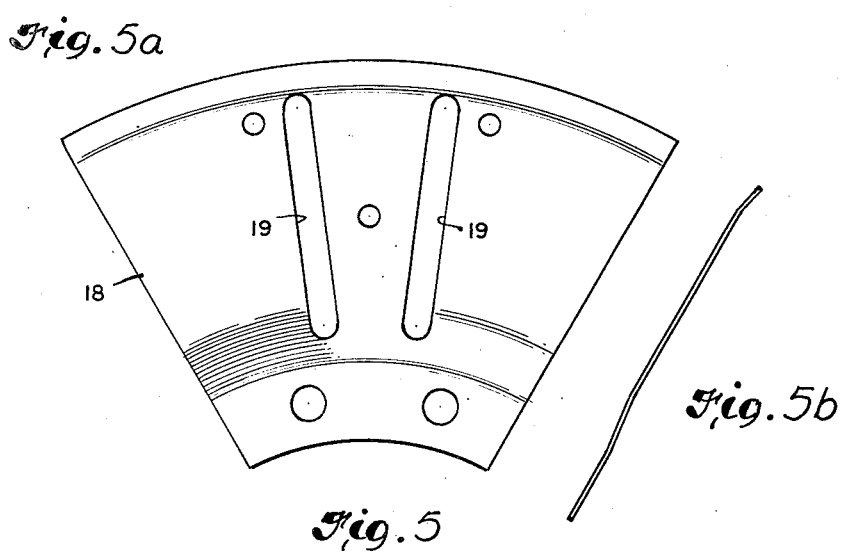
INVENTOR.
DANIEL KELLEHER
BY
Oberlin & Limbach
ATTORNEYS Patented Apr. 4, 1950

2,502,653

UNITED STATES PATENT OFFICE 2,502,653

CLUTCH PLATE

Daniel Kelleher, Berea, Ohio, assignor to
Ira Saks, Shaker Heights, Ohio

Application August 7, 1945, Serial No. 609,369

9 Claims. (Cl. 192—107)

The present improvements, relating as indicated to clutch plates, have more particular regard to a novel form of cushion mounting for the friction facing members of a clutch plate of the type at present largely employed in clutches for automotive vehicles.

Still more particularly the present invention pertains to an improved construction of separate segmental flexible elements for supporting such friction facings on the body of the clutch plate, such elements being adapted to yieldably receive or cushion the engaging pressure of the clutch plate when pressed between the driving and driven members of the clutch. The axial space within which this flexing action may occur is quite limited, being ordinarily only a small fraction of an inch in modern automotive clutch assemblies.

Accordingly, one principal object of my invention is to provide means whereby a maximum amount of cushioning action is obtained in such limited space. Another object is to provide cushioning means whereby the friction facing rings attached thereto will retain their desired flat form when under compression, i. e. be subjected to a minimum of distortion. Still another object is to provide cushion plates of relatively simple construction and which may be readily stamped out of flat sheet material into desired form. At the same time the design of the cushions is such as to facilitate the attachment of facing plates thereto, both in the original manufacture of the clutch plate and the replacement of such facings when this becomes necessary.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a partial plan view of a clutch plate embodying my present improved construction, a portion of the friction facing being broken away in order better to show the form of the segmental cushion members;

Fig. 2 is an axial section of the complete clutch plate;

Fig. 3 is a plan view showing a modified form of the segmental cushion;

Fig. 4 is a plan view of still another modified form of such cushion member, Figs. 4a, 4b and 4c showing edge elevations thereof, as indicated by the respective positions of said figures; and Fig. 5 is a plan view of still another modified form of the cushion plate, Figs. 5a and 5b showing edge elevations thereof, as indicated by the respective positions of said figures.

The general construction of the clutch plate is well known, being substantially the same as that shown, for example, in Patent No. 2,282,981 dated May 12, 1942, to J. T. Jarrett. Thus the plate comprises a central splined hub 1 formed with a radially projecting flange 2. Carried by the latter is a disc body comprising two complementary annular plates 3, 3, coil springs 4 being interposed between said body and the flange 2 of the hub in the customary manner so as to provide a yieldable transmission of torque between the hub and the disc body. The diameter of the latter is substantially less than the inner diameter of the opposed flat annular facings 5, 5 which constitute the friction elements of the clutch and are attached to the disc body through the medium of the cushion members 7 which will now be described.

Each of the latter, in the form illustrated in Figs. 1 and 2, consists of a plate of general segmental form, the inner edge of which lies between the complementary plates that form the disc body and are firmly secured thereto as by means of rivets 8. Such segmental plate is divided into two portions by a radial slot 9 that extends from such inner attached portion to a point a short distance from the outer edge of the plate. The portions of the plate which lie on either side of such slot are depressed, or rather expanded, in opposite directions so as to provide substantially flat faces that lie in planes correspondingly displaced to either side of the plane defined by the inner attached edge of the plate and by its outer or peripheral portion. The radial extent of these flat faces is somewhat less than the width of the friction facings 5, 5 which are respectively attached thereto by means of rivets 10.

As a result of the foregoing construction, when pressure is applied to the respective facings, tending to compress them together, the segmental cushions 7 will resiliently oppose such action up to the point where the respective offset portions of the plates are brought substantially into the same plane. During such compression the flat faces of the cushion member to which the friction facings are attached will remain substantially parallel and such facings be likewise maintained in parallelism as is highly desirable.

The modified form of segmental cushion 12 illustrated in Fig. 3 is identical with the one just shown and described in connection with Figs. 1 and 2 except that the slot 13 therein is extended to the outer or peripheral edge of the plate. However the portions of the latter which lie on the respective sides of the slot are formed and the friction facings are attached thereto in the same manner as before.

In the case of the modified construction illustrated in Fig. 4 and accompanying edge elevational views, the slot need not necessarily be disposed on a strictly radial line. Thus the plate 15 in question has a slot 16 that lies at an angle to a radial line when the inner edge of such plate is properly attached to the disc body. The plate also differs from the one previously defined in its outline in that its sides are cut so as to incline in the same direction as such slot 16. The portions of the plate lying on either side of slot 16 will be depressed in opposite directions as before.

In the modification illustrated in Fig. 5 and accompanying edge elevations, the plate instead of being formed with a single slot, has two radially extending slots 19 which are spaced transversely of the plate so as to divide the same into three sections. As best shown in Fig. 5a, such central section is offset in one direction and the two outer sections in the opposite direction from the original plane of the plate. One of the friction facings will be attached to the one series of such offset plate faces and the other friction facing to the other such series, and the plates will have substantially the same cushioning action as previously described.

In each of the foregoing forms of segmental cushion, it will be clear that the friction facing rings will be maintained in substantially parallel relation irrespective of the flattening out of the cushion members due to application of pressure to the facing rings. Furthermore, the cushioning effect will be equally divided as between the two facing members. At the same time the cushioning members are of extremely simple construction and are readily adapted for use in clutch plates of the type in question without any modification being required in the construction thereof as at present being made.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A clutch plate comprising a disk body, a series of cushion members attached in circumferentially spaced relation to said body, each of said members comprising a plate formed with a slot extending in a generally radial direction from a point beyond its inner attached edge and with oppositely displaced portions on opposite sides of such slot presenting corresponding displaced flat faces lying in approximately parallel planes, said plate being deformed along radially spaced and generally circumferentially extending areas disposed within the radial extremities of such slot to define such flat faces between such areas, and friction facing rings respectively attached to the two series of faces thus presented by said members.

2. A clutch plate comprising a disk body, a series of cushion members attached in circumferentially spaced relation to said body, each of said members comprising a plate formed with a plurality of slots extending in a generally radial direction from circumferentially spaced points beyond its inner attached edge and with oppositely displaced portions on opposite sides of each slot presenting corresponding displaced flat faces lying in approximately parallel planes, said plate being deformed along radially spaced and generally circumferentially extending areas disposed within the radial extremities of such slots to define such flat faces between such areas, and friction facing rings respectively attached to the two series of faces thus presented by said members.

3. A clutch plate comprising a disk body, a series of cushion members attached in circumferentially spaced relation to said body, each of said members comprising a plate formed with a slot extending in a generally radial direction from a point beyond its inner attached edge to a point short of its outer edge and with oppositely displaced portions on opposite sides of such slot presenting corresponding displaced flat faces lying in approximately parallel planes, said plate being deformed along radially spaced and generally circumferentially extending areas disposed within the radial extremities of such slot to define such flat faces between such areas, and friction facing rings respectively attached to the two series of faces thus presented by said members.

4. A clutch plate comprising a disk body, a series of cushion members attached in circumferentially spaced relation to said body, each of said members comprising a plate formed with a slot extending in a generally radial direction from a point beyond its inner attached edge through its outer edge and with oppositely displaced portions on opposite sides of such slot presenting corresponding displaced flat faces lying in approximately parallel planes, said plate being deformed along radially spaced and generally circumferentially extending areas disposed within the radial extremities of such slot to define such flat faces between such areas, and friction facing rings respectively attached to the two series of faces thus presented by said members.

5. A clutch plate comprising a disk body, a series of cushion members attached in circumferentially spaced relation to said body, each of said members comprising a plate formed with a slot extending in a generally radial direction from a point beyond its inner attached edge and with oppositely displaced portions on opposite sides of such slot presenting corresponding displaced flat faces lying in approximately parallel planes, said plate being deformed along radially spaced and generally circumferentially extending areas disposed within the radial extremities of such slot to define such flat faces between such areas, and friction facing rings respectively attached to the two series of faces thus presented by said members, such faces each extending over a major portion of the radial width of said facing rings.

6. A clutch plate comprising a disk body, a series of cushion members attached in circumferentially spaced relation to said body, each of said members comprising a plate formed with a slot extending in a generally radial direction from a point beyond its inner attached edge and with oppositely displaced portions on opposite sides of such slot presenting corresponding displaced flat faces lying in approximately parallel planes, said plate being deformed along radially spaced and generally circumferentially extending areas disposed within the radial extremities of such slot to define such flat faces between such areas, and friction facing rings respectively attached to the two series of faces thus presented by said members, the outer of such areas being more abruptly deformed relative to the planes of said facing rings than the inner of such areas.

7. A clutch plate comprising a disk body, a series of cushion members attached in circumferentially spaced relation to said body, each of said members comprising a plate formed with inner and outer edges lying in substantially the same plane, with a slot extending in a generally radial direction from a point beyond such inner edge, and with intermediate portions on opposite sides of such slot displaced oppositely with respect to such edges to present corresponding displaced flat faces lying in approximately parallel planes, said plate being deformed along radially spaced and generally circumferentially extending areas disposed within the radial extremities of such slot to define such flat faces between such areas, and friction facing rings respectively attached to the two series of faces thus presented by said members.

8. A cushion member for clutch plates comprising a plate formed with a slot therethrough extending from one side toward the opposite side and with adjacent oppositely displaced portions respectively extending from the opposite ends of said plate to such a slot to present corresponding adjacent flat faces lying in approximately parallel planes to which friction facing rings are adapted to be attached.

9. A cushion member for clutch plates comprising a plate formed with opposite side portions lying in substantially the same plane, with a slot therethrough extending from one side portion to the other, and with adjacent intermediate displaced portions on opposite sides of such slot and between such side portions and respectively extending from the opposite ends of said plate to such slot to present corresponding adjacent flat faces lying in approximately parallel planes, such intermediate portions being oppositely displaced with respect to such side portions and having their side boundaries within the extremities of such slot, the opposite edges of such slot constituting the entire adjacent ends of such displaced portions.

DANIEL KELLEHER.

REFERENCES CITED

The following references are of record in the file of this patent:

UNITED STATES PATENTS

| Number | Name | Date |
| --- | --- | --- |
| 2,195,666 | Wolfram | Apr. 2, 1940 |
| 2,244,134 | Thelander | June 3, 1941 |
| 2,256,698 | Wolfram | Sept. 23, 1941 |
| 2,282,981 | Jarrett | May 12, 1942 |
| 2,283,113 | Wemp | May 12, 1942 |
| 2,324,913 | Daukus | July 20, 1943 |